(12) United States Patent
Neary (10) Patent No.: US 7,311,763 B2
(45) Date of Patent: Dec. 25, 2007

(54) GAS SEPARATION VESSEL APPARATUS

(76) Inventor: David Lloyd Neary, 3612 Eden Dr., Dallas, TX (US) 75287

( * ) Notice: Subject to any disclaimer, the term of this patent is extended or adjusted under 35 U.S.C. 154(b) by 330 days.

(21) Appl. No.: 11/112,614

(22) Filed: Apr. 22, 2005

(65) Prior Publication Data

US 2006/0236867 A1    Oct. 26, 2006

(51) Int. Cl.
*B01D 53/047* (2006.01)
(52) U.S. Cl. .................................... 96/121; 95/133
(58) Field of Classification Search ............ 96/121, 96/133, 138, 151
See application file for complete search history.

(56) References Cited

U.S. PATENT DOCUMENTS

| | | | |
|---|---|---|---|
| 2,626,675 A * | 1/1953 | Maher | 96/144 |
| 4,838,901 A * | 6/1989 | Schmidt et al. | 95/90 |
| 4,892,565 A | 1/1990 | Schmidt et al. | |
| 5,169,414 A * | 12/1992 | Panzica et al. | 95/113 |
| 5,509,956 A * | 4/1996 | Opperman et al. | 95/109 |
| 5,538,544 A | 7/1996 | Nowobilski et al. | |
| 5,632,802 A | 5/1997 | Grgich et al. | |
| 5,673,493 A * | 10/1997 | Kazakis et al. | 34/80 |
| 5,674,311 A | 10/1997 | Notaro et al. | |
| 5,759,242 A | 6/1998 | Smolarek et al. | |
| 5,964,259 A | 10/1999 | Ackley et al. | |
| 6,086,659 A | 7/2000 | Tentarelli | |
| 6,334,889 B1 | 1/2002 | Smolarek et al. | |
| 6,770,120 B2 | 8/2004 | Neu et al. | |
| 6,878,186 B2 | 4/2005 | Neary | |

FOREIGN PATENT DOCUMENTS

WO        WO 01/66239 A2 *    9/2001

* cited by examiner

*Primary Examiner*—Frank M. Lawrence
(74) *Attorney, Agent, or Firm*—Cash Klemchuk Powers Taylor LLP; Darin M. Klemchuk (57) ABSTRACT

An improved gas separation vessel apparatus is provided. The gas separation vessel apparatus is adapted to separate oxygen and other process gases, and it employs both vertically-, or alternatively, horizontally-positioned vessels. The gas separation vessels disclosed contain removable radial-flow bed cartridge-type adsorbent subassemblies, which may be replaced, substituted, or serviced with minimal system down time.

18 Claims, 5 Drawing Sheets

GAS SEPARATION VESSEL APPARATUS

BACKGROUND

1. Field of the Invention

The present invention relates generally to improved energy efficient air and process gas adsorption/desorption vessel assemblies with removable radial-flow adsorption bed cartridge subassemblies, particularly applied to VSA gas separation vessels producing a high purity oxygen gas product or other purified process product.

Within the process gas industry, and in particular within the air separation market, the continuing increasing costs of electric power makes the energy efficiency of gas separation systems of ever increasing importance. The common art methods of separating a desired molecular gas from a mixture of process gases, or the separation of nitrogen from air to provide a highly predominant oxygen gaseous product stream, commonly includes the utilization of (a) power-intensive multi-stage membrane separation system, or refrigerated or cryogenic generated liquid extraction systems; (b) pressure swing adsorption (PSA) systems for producing moderate pressure supplies of predominant oxygen gas; and (c) vacuum pressure swing adsorption (VPSA) units, or also interchangeably referred to as vacuum swing adsorption swing units (VSA) units. VSA units generally require the least of all system power consumptions per ton of product gas of less than 100% purity.

Controlled temperature swing adsorption (TSA) applied within PSA or VSA cycles can be employed when a selected preferred adsorbent exhibits superior gas adsorption/desorption performance within specific ranges of operating gas temperature. Application of TSA is typically employed in the example separation of hydrogen from within a catalytic steam-reforming process reaction system that produces a typical process gas stream mixture of hydrogen, carbon monoxide and carbon dioxide, and the separation of one or more hydrocarbon gases from a petrochemical or petroleum refining process supplied feed gas mixture of hydrocarbon gases. In the case of adsorbed hydrogen being the preferred gas product, the hydrogen gas product is discharged from the gas separation vessel during the desorption cycle portion of the gas separation process.

There is therefore a need for a gas separation vessel apparatus assembly that can operate with, but not limited to, low pressure gas feedstock adsorption/desorption systems with extraordinary low system differential pressures that further contributes to achieving the lowest VSA gas separation systems energy consumptions (or Best Available Technology energy performance). A need also exists for an assembly that addresses other important long-term operational requirement needs for future rapid adsorbent replacement for upgraded performance capabilities.

Gas separation feedstock gases can comprise low positive pressure 'vapor recovery' or process 'off-gases' developed within facility petrochemical process or petroleum refining operations. They can also comprise feedstock air (or conditioned air at atmospheric or slight sub-atmospheric pressure) to produce a predominant rich oxygen product gas of lesser flow during a gas separation vessel's adsorption sequence of operation, and a predominant nitrogen gas waste gas of greater flow during a gas separation vessel desorption sequence of operation.

In the case of petroleum refining operations wherein at least two hydrocarbon gases having different adsorption characteristics are present, the more strongly adsorbable gas can be an impurity which is removed from the less strongly adsorbable gas which is taken off as a product gas; or, the more strongly adsorbable gas can be the desired product gas that is separated from the less strongly adsorbable gas. A petroleum refining process stream mixture of propylene and propane is such an example. Propylene is the more valued product and the more strongly adsorbable gas which can be separated from the less strongly adsorbable propane gas of lesser value.

In the case with large industrial petrochemical and petroleum refining facilities, process gas streams may be varied in composition within a relative short time period, compared to other industries continuous process streams that may remain unchanged for a number of years. From a facility lost revenue and operating cost standpoint, it is important to be able to minimize labor, material expense, and the time required to remove and replace the old adsorbents with new optimum performance adsorption materials as required to adapt existing gas separation or adsorption-desorption vessels to these new variances in process gas composition streams. Especially in low pressure gas streams, unnecessarily high adsorbent bed gas velocities and accompanying separation vessel pressure drops can result in the loss of adsorbent performance from bed fluidization and significant increased electric power costs for gas compression. To achieve the combined needs of providing operating high energy efficient gas separation vessels that are economically adaptable to rapid upgrades or changes in adsorbent bed material, the present invention includes an improved gas separation vessel assembly and internal subassembly device Adapted to satisfy these needs.

2. Description of Related Art

A sample review of known U.S. patents having variations of typical current art gas separation vessels within PSA and VSA systems includes the following: U.S. Pat. No. 5,759,242 discloses the design of a vertical adsorber vessel having an internal means to direct gas flows radially through the molecular sieve adsorbent material contained within the welded-closed vertical adsorber vessel. The 'Background of the Art' within U.S. Pat. No. 5,759,242 extensively describes the numerous operating shortcomings of conventional VSA vertical adsorber vessels having axial gas flows through the vertical beds of molecular sieve adsorbents.

U.S. Pat. No. 5,964,259 discloses an apparatus design and method of loading multiple molecular sieve adsorbents into the interior of a welded-closed vertical adsorber vessel therein designed to contain vertical radial-flow adsorbent beds as described in U.S. Pat. No. 5,759,242.

U.S. Pat. No. 6,086,659 addresses adsorption vessel design approaches relating to radial-flow type vessels employing temperature swing adsorption ("TSA"), in order to minimize or offset the multiple consequences of cyclic thermal expansion and contraction of materials within the adsorption vessel. The U.S. Pat. No. 6,086,659 discloses a welded-closed type vertical adsorption vessel, therein containing multiple radially gas-outward flow vertical beds concentrically-positioned around the vessel center axis positioned cylindrical feed gas delivery chamber into which feed gas is introduced through the top of the vessel. Each described vertical adsorbent bed can contain a different adsorbent material, the containment of each bed being accomplished with the invention described perforated metal bed partition and screen design configuration to withstand thermal expansion and contraction stresses. The final product gas exits the outer-most concentric bed retention screen into the outer annulus gas flow space between the vessel inside diameter and the described outer concentric bed retention screen. The product gas is thereafter withdrawn through the bottom portion of the vessel assembly apparatus. Individual single flanged nozzles are provided and aligned-positioned in the top welded head of the vessel, to enable the filling or empting of each separate individual adsorbent bed. U.S. Pat. No. 6,770,120 discloses a welded-closed type vertical adsorption vessel, therein containing either (1) two radial gas-inward flow connected vertical beds concentrically-positioned around the vessel center axis positioned inner cylindrical product delivery chamber through which the product gas exits from the bottom of the vessel; (2) one radial gas-inward flow connected vertical bed concentrically-positioned around the vessel center axis positioned inner cylindrical volume space that is occupied by a vertical axial-flow adsorption bed receiving a series-connected flow of gases from the upstream radial-flow adsorption bed, with final product gas flow exiting from the bottom of the vertical vessel; or (3) one radial gas-inward flow connected vertical bed concentrically-positioned around the vertical vessel center axis positioned inner cylindrical volume space that can be utilized in one variation as a gas storage tank. U.S. Pat. Nos. 5,674,311, 5,538,544, and 6,334,889 respectively describe methods by which the conventional art PSA and VSA systems' (comprising vertical adsorber vessels and vertically deep adsorbent beds) inherit problems of adsorbent bed temperature gradients, uneven gas flow distribution, and adsorbent bed fluidization can be reduced to improve adsorbent bed efficiencies.

Those skilled in the art will appreciate that the various approaches to PSA and VSA vessel apparatus separation of gases, contained within the above example patents and other existing published art, predominantly limit themselves to employed vertical vessel apparatus that comprise either vertical axial gas flows or horizontal radial gas flows of gases through a 'fixed' vertically disposed bed column of adsorbent material. The described current art vertical vessel configurations share many common limitations that negatively impact the vessel's overall consistent gas product purity, maintenance of operating adsorbent bed uniformity and adsorbent structural form integrity, and economical power consumption. Previous art vessels have not addressed the need for a means to carry out a rapid and economical adsorbent bed removal and replacement as new improved performance adsorbent materials become available, or when the existing adsorbent bed becomes contaminated from a process upstream upset condition that contaminates both the process feed gas supplied to the gas separation vessels and the adsorbent materials contained therein.

A need exists, therefore, for a horizontal vessel apparatus that can overcome conventional art air or process gas separation vessel apparatus limitations. A need also exists for a vertical vessel apparatus that can overcome conventional art air or process gas separation vessel apparatus limitations. The presented invention gas separation vessel apparatus, and embodiments thereof, satisfy these needs and have the following objectives:

1. It is a first objective to significantly reduce the electric power consumption by reducing the air or process gas separation vessel's radial-gas flow adsorbent bed depth, and therefore reduce the gas flow differential pressure across the gas flow bed depth that conventionally requires gas compression power to overcome.
2. It is a second objective to provide an air or process gas separation vessel apparatus that greatly reduces the molecular sieve bed gas velocities as are employed within conventional PSA and VSA axial gas flow vertical vessel systems, and further reduce current art radial-gas flow bed velocities, thereby achieving significantly increased feedstock gases 'residence time' for gases to permeate into the porous structure of employed molecular sieve adsorbent bed material and decreased potential of "bed fluidization" with accompanying molecular sieve material degrading attrition from occurring.
3. It is a third objective to achieve a level of precise quantitative adsorbent placement and desired compaction within each multiple separated adsorbent bed material segments that make up the total employed adsorbent bed material employed with each invention embodied radial-flow bed cartridge subassembly. This degree of adsorption bed placement quality control is not possible with existing art axial flow or radial flow adsorbent beds contained within present art vertical gas separation vessels. This objective can also improve both the uniform adsorbent material's adsorption-desorption performance throughout the invention embodied radial-flow bed cartridge, as well as to further eliminate the potential of "bed fluidization" described in the above second objective.
4. It is a fourth objective to provide the means of eliminating conventional PSA or VSA air separation vertical vessel's deep molecular sieve adsorbent beds' operational axial gas flow temperature variance characteristics that can negatively affect the beds' nitrogen adsorbed gas separation efficiencies.
5. It is a fifth objective of the present air or process gas separation vessel apparatus described herein, to provide an apparatus can be adaptable to a manufacturer's or system fabricator's chosen selection of adsorbent molecular sieve materials, desired product gas production rate and purity, length and diameter dimensional configurations of vessel assemblies, and the employment of selected embodiments and variations provided by the invention.
6. It is a sixth objective that the employed air or process gas separation vessel apparatus have the inherit subassembly design means that can accommodate the long-term operational employment of both present or later added future molecular sieve material adsorbents whose fragile structures can be incompatible with the combined cyclic adsorption-desorption pressure swings and weight bearing loads imposed by conventional vertical adsorber vessel designs having either radial or axial style gas flows through their common configuration of vertically disposed and fixed adsorbent beds.

All references cited herein are incorporated by reference to the maximum extent allowable by law. To the extent a reference may not be fully incorporated herein, it is incorporated by reference for background purposes and indicative of the knowledge of one of ordinary skill in the art.

SUMMARY

The invention generally is directed to a vessel apparatus used in gas separation processes employing an adsorbent bed material. More specifically, the invention is directed to apparatus means that includes an air or process gas separation vessel with one or multiple embodied radial-flow bed cartridge-type adsorbent bed subassembly devices contained therein. Hereafter, the adsorbent bed subassembly may be referred to as a "Radial-Flow Bed Cartridge" subassembly, or more simply referred to as a "RFBC subassembly." The invention embodiment vessel assembly apparatus into which a RFBC subassembly is inserted, may hereafter be referred to more simply as a "RFBC vessel assembly." One or multiple embodied RFBC subassembly devices can provide the entire designated rated gas adsorption capacity of a gas separation vessel apparatus. The present invention apparatus is distinguished from other art by its embodiments of unique simplified gas separation vessel design and replaceable internal vessel positioned RFBC subassembly devices.

A first embodiment of the invention responds to a need wherein a horizontal RFBC vessel assembly configuration is particularly suited to, but not limited to, large volume rated air or gas process streams. In this embodiment, the design of the RFBC vessel assembly is specific to the invention installed in a horizontal-axis plane. The horizontal position and design of the vessel permits manageable onsite installation or removal/replacement of individual non-conventional adsorbent bed subassemblies that are typically larger in size and greater in weight when applied to the gas separation of large capacity flow process streams. There can be variances to this first embodiment of the invention, as described later.

A second embodiment of the invention responds to the need to satisfy the invention's stated objectives that overcome the operational shortcomings that presently exist with present art large capacity air or gas conventional vertical adsorber vessel designs having either radial or axial style gas flows through the adsorbent beds, but both styles having fixed vertically disposed high adsorbent beds. The invention second embodiment comprises a horizontal RFBC subassembly for exclusive employment within the horizontal-positioned first embodiment RFBC vessel assembly.

A third embodiment of the invention responds to need wherein a vertical RFBC vessel assembly apparatus configuration is particularly suited to, but not limited to, smaller volume rated air or gas process streams. In this embodiment, the design of the RFBC vessel assembly apparatus is specific to the invention installed in a vertical-axis plane. The vertical positioning and vessel vertical design dimensions can permit easily manageable onsite installation or removal/replacement of individual RFBC subassemblies that are typically smaller in size and of lesser weight than those applied within large capacity flow process streams. There can be variances to the third embodiment of the invention, as described later.

A fourth embodiment of the invention responds to the need to satisfy the invention's stated objectives that overcomes the operational shortcomings that presently exist with present art small to medium air or gas capacity conventional vertical adsorber vessel apparatus designs having either radial or axial style gas flows through the adsorbent beds, wherein both styles have common fixed vertically disposed high adsorbent beds. The fourth embodiment comprises a vertical RFBC subassembly for exclusive employment within vertically-positioned air or gas RFBC vessel assemblies.

The present invention apparatus embodies a non-conventional art RFBC vessel assembly and a non-conventional art RFBC subassembly that collectively therein achieve all of the fore-described invention's six objectives during PSA or VSA system methods of air or process gas separation, the PSA or VSA methods alternatively comprising controlled gas temperature swings during sequenced adsorption and desorption cycles within each of two conventionally applied parallel trains, each train comprising one or more RFBC vessel assembly.

Other objects, features, and advantages of the present invention will become apparent with reference to the drawings and detailed description that follow.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The application of the present invention in its following first and second embodiment form is initially disclosed in the inventor's U.S. Pat. No. 6,878,188, issued on Apr. 12, 2005, the teachings of which are incorporated herein by reference in their entirety.

The invention gas separation vessel apparatus is intended to be primarily employed in PSA and VSA adsorption/desorption gas separation systems, wherein most commonly two parallel trains of vessels (each train comprising one, or two or more parallel vessels) operating together, one train operating in the adsorption cycle mode, while the other train operates in the desorption cycle mode. Each vessel apparatus is designed to alternately function in one described cycle mode before alternating to function in the other cycle mode. Applications to which the invention can be applied include gas separation systems requiring two steps of gas separation that embodies a series-connection of a first PSA or VSA adsorption/desorption gas separation subsystem employing a first adsorbent material in communication with a downstream positioned second PSA or VSA adsorption/desorption gas separation subsystem employing a second adsorbent material of different molecular composition than employed in the first subsystem.

For larger industrial applications requiring on-site equipment deliveries by conventional over the road flatbed tractor trailers, the horizontal RFBC vessel assemblies may preferably range in diameter between 3 feet to 8 feet and the vessel shell lengths may preferably range between 20 feet to 40 feet. For small commercial to moderate size industrial applications, the vertical RFBC vessel assemblies may preferably comprise, but not limited to, a range in diameters between 1 foot to 4 feet. The vessel shell lengths may preferably comprise, but not limited to, a range of lengths between 2 feet to 10 feet. The vertically disposed depth of adsorbent material within each adsorbent bed segment contained within a single RFBC subassembly, may preferably comprise, but not limited to, a range of depths between 4 inches to 3 feet depending on the application and the ability of the selected adsorbent bead, pellet, or other shape to withstand fracturing or attrition during the long-term applied combined adsorbent weight loads and cycling of gas flows. The radial-flow depth of adsorbent through which a gas flows within a RFBC subassembly embodiment may preferably comprise, but not limited to, a range of depths between 1 inch to 40 inches over a range of small commercial to large industrial gas volume flow rate applications.

The invention RFBC vessel assembly apparatus can employ within its embodied RFBC subassemblies those absorbents known in the art that are suitable for specific gas pre-conditioning and/or primary process gas separation applications. Examples can include, but are not limited to microporous crystalline zeolite and non-zeolite catalysts, particularly aluminophosphates (AlPO) and silicoaluminophosphates (SAPO), carbon zeolites, other zeolite like materials, activated aluminas, silica gel, other commercially available molecular sieves or mixtures thereof. Commercially available molecular sieve materials suitable for air separation can include, among others, zeolite 4A, 5A, 13X, and various lithium caton forms of zeolite X. The invention provided vessel assembly embodied features are described later that enable rapid and economical on-site conversion to future developed high efficiency adsorbent materials.

Figure 1:
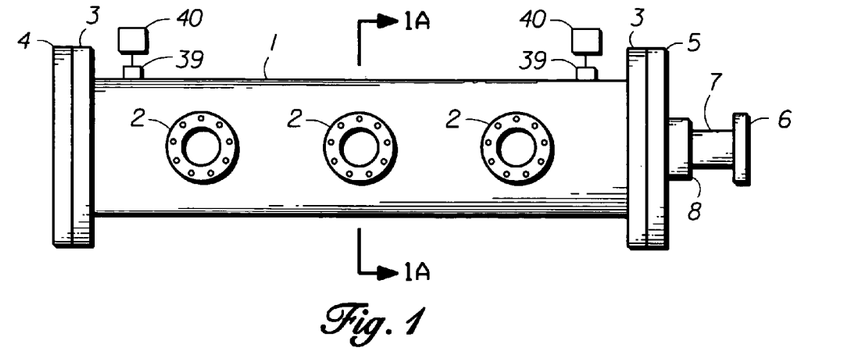
FIG. 1 is a side view of the invention's first embodiment described horizontal-type RFBC vessel assembly with centerline-position gas connections.

Referring now more particularly to FIG. 1, the invention's RFBC vessel assembly with outer shell 1 is shown in a first embodiment horizontal side-view position. The RFBC vessel assembly cylindrical body shell material can include either a typical example carbon steel or alloy steel pipe or rolled and welded alloy steel sheet or plate, or alternately commercially available pipe of high density polyethylene (HDPE) grade 3408 extruded pipe of appropriate diameter and SDR number. The material, diameter, and length of the RFBC vessel assembly outer shell 1 will primarily vary with the economical accommodation of desired rated gas separation capacity for each RFBC vessel assembly and the chosen operating pressure and temperature of the adsorbent or molecular sieve material employed within the selected RFBC subassembly. Typically, the RFBC vessel assembly outer shell 1 will have a length to diameter ratio of greater than 2:1.

RFBC vessel assembly shell flanged inlet gas connections 2 are shown as being of quantity three in number but can be one in number for adsorber assemblies of less than 6 feet in shell length. Gas connections 2 serve as both supply gas connection means for the flow of feedstock gases into the RFBC vessel assembly during the assembly's adsorption sequence operation as well as the connections for the discharge of exhaust flows comprising waste gases extracted from within the RFBC vessel assembly during its desorption sequence operation.

As shown in FIG. 1, flanged connections 3 can be welded to both ends of the example RFBC vessel assembly shell 1. A gasketed blind flange 4 can provide the closure means for one end of the example RFBC vessel assembly. Alternately on one end of an example steel vessel assembly shell 1, flanged connections 3 and gasketed blind flange 4 may be replaced by one ASME pipe or vessel weld cap. Although a detailed fabrication design of the RFBC vessel assembly is not within the scope of the invention, one or both ends of the RFBC vessel assembly can be provided with a subassembly closure means, which can comprise the comparable elements of a machined blind flange component 5, a packing or sealing gland component 8, and a adjustable axial-positioned cylindrical hollow element or pipe 7 with end welded flange 6. Element 7 extends into the RFBC vessel assembly, therein establishing a gas sealing contact and flow communication with the RFBC sub-assembly's central axial-positioned gas void space 14 as provided by the inside bore of pipe 16 in FIG. 1A and FIG. 2A. As a PSA or VSA desorption operation may require, purge gas can also be emitted into connection 6 for flow passage into the described central axial-positioned gas void space 14 of the RFBC sub-assembly(s) positioned within the RFBC vessel assembly. Any design of similar functioning closure and sealing means can provide the connection and conduit means for the RFBC vessel assembly separated product gas stream flow to be extracted or exhausted from within the RFBC vessel assembly for conduit flow-communication to an employed gas separation system. Said designs of similar functioning closure and sealing means can also be provided as modified commercially available pipe or vessel hinged closure assemblies that are welded to either or both ends of the RFBC vessel assembly shell 1, therein providing the means for easy installation or change-out of RFBC subassembly(s) contained within the RFBC vessel assembly.

The FIG. 1 described invention's unique gas RFBC vessel assembly apparatus with end-closure design means can accept the employment of herein described RFBC subassembly that can be readily inserted or removed when the gas separation system's feed gas and desired gas product duties change or when more advanced and efficient molecular sieves become available as new products of advanced gas adsorbent technology.

Figure 1A:
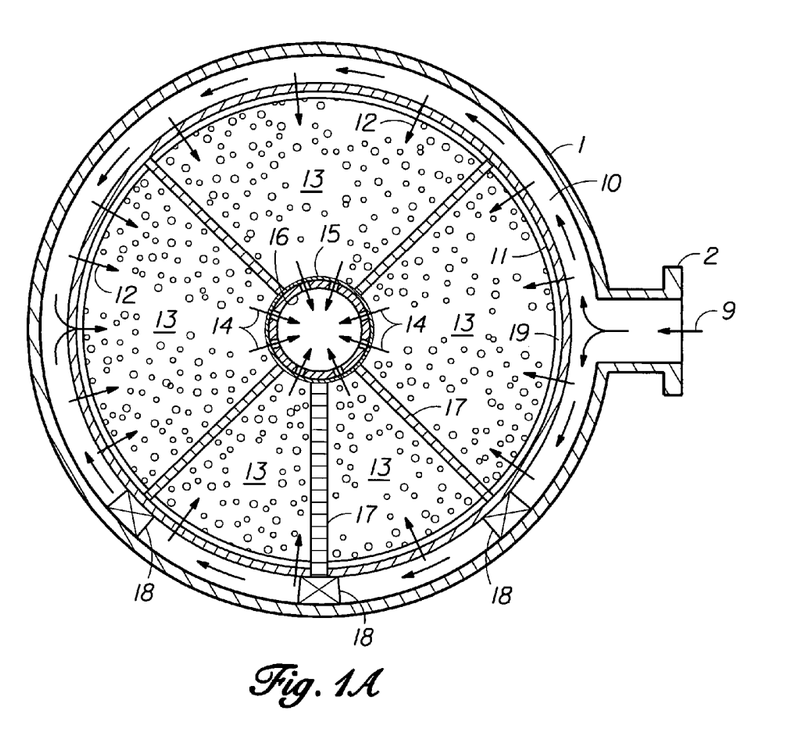
FIG. 1A is a cross-sectional view of the invention's first embodiment described horizontal-type RFBC vessel assembly with centerline-position gas connections and displayed invention's second embodiment internally-positioned radial-flow bed cartridge RFBC sub-assembly.

Referring now more particularly to FIG. 1A therein showing the 1A-1A cross-sectional view of the FIG. 1 RFBC vessel assembly, the flow stream 9 of air or process gas feedstock enters the invention's RFBC vessel assembly apparatus through flange connection 2. When the RFBC vessel assembly shell diameters are dimensionally greater than 4 feet, flange connections 2 can alternately be positioned on both sides of the vessel assembly shell 1 at example 3 o'clock and 9 o'clock positions. This described positioning of flange connections 2 can facilitate the closely positioned installation of one horizontal RFBC vessel assembly over the top of another horizontally installed RFBC vessel assembly.

During the gas adsorption sequence of operation, the in-flow of air or process gas feedstock 9 enters the RFBC vessel assembly apparatus through flange connection 2 and the flow of gases are distributed at low gas flow velocities within the outer annular void space 10 surrounding combined adsorbent bed material 13 contained within the one or multiple RFBC subassembly. The flow of air or process gas feedstock 9 within void space 10 flows radially-inward as shown by directional gas flow 12 through perforated corrosion resistant alloy metal cover sheet 11 and inner surface attached corrosion resistant alloy wire mesh or other porous glass fiber or synthetic fiber based media material 19 that collectively secures the outer surface of each wedge-shape adsorbent bed segment 13 positioned within each RFBC subassembly. The air or process gas feedstock flow 12 initial flow velocity into the adsorbent bed 13 of greatly increased surface area is corresponding greatly reduced in velocity, as compared to a conventional PSA or VSA system's vertical vessel's gas velocity from its axial gas flow through an equal volume of bed adsorbent. As the waste gas portions of the feedstock gas are steadily adsorbed during the progressive radially-inward gas flow penetration into each molecular sieve bed segment 13 depth of progressive decreasing cross-section area, the desired product gas flow 14 (high purity oxygen in the case of a preferred pure VSA air separation system) emerges from the inner surface of the adsorbent bed 13 at an approximate continued equal gas flow velocity rate as the feedstock flow 12 gas entry velocity into the adsorbent bed 13. The product gas further emerges from the adsorbent bed segment 13 and passes through corrosion resistant alloy wire mesh or other porous glass fiber or synthetic fiber based media material 15 and through the perforated or slotted wall of pipe or tubing centerline axis-positioned central core pipe or tubing 16 as the gross product 14 oxygen stream that is subsequently thereafter flow-exhausted from the RFBC vessel assembly through connection 6 shown in FIG. 1.

During the RFBC vessel assembly's PSA or VSA desorption sequence of operation (with counter-current directional gas flow to that indicated in FIG. 1A for the adsorption operation), the extracted or exhausted flow of waste gases (contained with the RFBC subassembly adsorbent 13) comprise a reverse radially-outward flow of extracted waste gases that enters outer annular flow void space 10. Thereafter, the combined flow of waste gases within void space 10 exits the RFBC vessel assembly through gas connection 2 in a radial-outward direction. As a concluding portion of the RFBG vessel assembly's desorption operation and prior to the low-end psia desorption operation pressure condition being achieved, a limited flow quantity of produced product gas can be axially introduced through RFBC vessel assembly connection 6 of FIG. 1 into the central axial core pipe or tubing 16. The flow of purge gas passes through the perforated or slotted openings in pipe or tubing 16, through described media 15 and adsorbent 13, and described media 19 and perforated corrosion resistant alloy cover sheet 11 as a resulting mixture of waste gas and product purge gas flowing into outer void space 10 before exiting radially-outward from the from the RFBC vessel assembly through connection 2. According to a separation system's design, the flow of purge gas into the RFBC vessel assembly may be terminated just prior to the end of the employed system's desorption sequence of operation, or may be continued briefly to establish a system desired level of internal vessel pressure.

Figure 2:
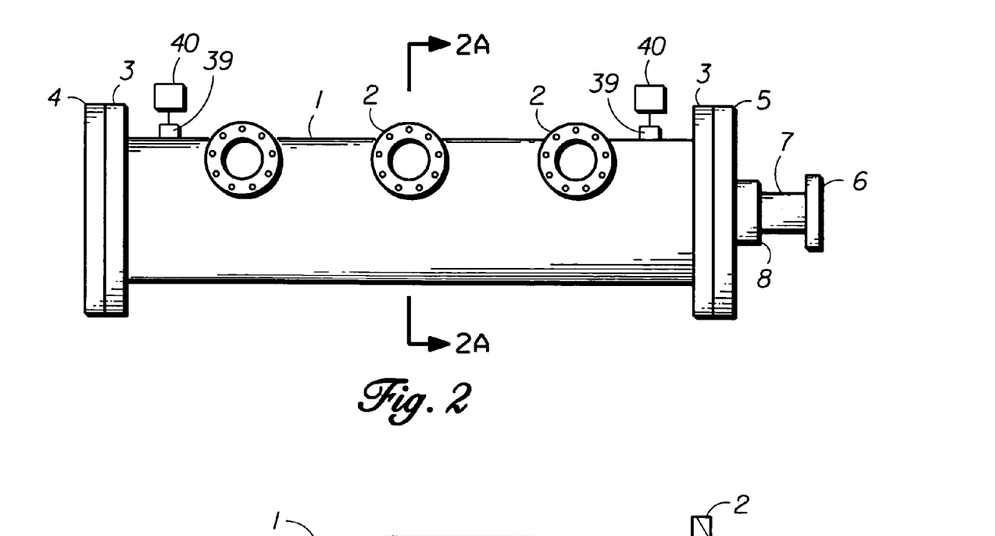
FIG. 2 is a side view of the horizontal-type gas adsorption-desorption vessel 1 with side tangential-position gas connections.

Within a provided inner diameter of vessel shell 1, the uniform annular gas distribution void space 10 cross-sectional flow area and volume is established by the diameter of the RFBC subassembly, RFBC subassembly centering provided by the projection of the threaded end of pipe 16 alignment with the centerline of cylindrical hollow element or pipe 7 with end welded flange 6 shown in FIG. 2, and the height of the short-length low surface friction spacer blocks 18 that are appropriately and intermittently spaced longitudinally along the length of the RFBC vessel assembly's inner surface of vessel shell 1.

Additional low surface friction spacer blocks 18 can be positioned as required to increase the ease in which the RFBC vessel assembly's RFBG subassemblies can be inserted into or removed from the interior of the horizontal-positioned RFBC vessel assembly.

Each wedge-shape adsorbent bed segment 13 is established within the cross-section space boundary formed by (a) the combined perforated metal corrosion resistant alloy cover sheet 11 and inner surface attached corrosion resistant alloy wire mesh or other porous glass fiber or synthetic fiber based media material 19, (b) the adsorbent side-support plate partitions 17 connected to both perforated corrosion resistant alloy cover metal sheet 11 and central axial core pipe or tubing 16, and (c) an outer diameter arc segment of the centerline axis-positioned central core perforated or slotted pipe or tubing 16 with attached layer of corrosion resistant alloy wire mesh or other porous glass fiber or synthetic fiber based media material 15. FIG. 1A shows five adsorbent side-support plate partitions 17. However the quantity of employed partitions 17 can vary preferably between two and twelve depending on the diameter of the RFBC subassembly and the structural strength characteristics of the employed adsorbent material form.

The inner end surface of each radial partition 17 can be welded to inner pipe 16, and the outer perforated corrosion resistant alloy metal cover 11 skip-spot-welded to the mating outer end contact surfaces of the radial partition 17. The longitudinal end surfaces of the radial partitions have mating contact with the inner surfaces of the RFBC subassembly end caps 20 and 21 as shown in the following FIG. 3 and FIG. 4 drawings. The adsorbent volume contained within each adsorbent segment 13, is therefore established by its cross-section space boundary area and the length of the longitudinal radial partition 17.

The corrosion resistant alloy wire mesh or other porous glass fiber or synthetic fiber based media materials 15 and 19 can be positioned and bonded respectively to the outer diameter surface of perforated or slotted inner pipe 16 and the inner surface of perforated metal corrosion resistant alloy outer cover sheet 11, each positioning further occurring between individual adjacent partitions 17 as joined to inner pipe 16 and to outer cover 11, with each described media segment being approximately equal to the longitudinal length of the radial partitions 17

Referring now more particularly to FIG. 2, the drawing is a variance of the first embodiment of the invention as illustrated in the preceding FIGS. 1 and 1A drawings, such that like reference characters refer to the same parts throughout the different variance views of the same embodiment.

A first embodiment variation configuration of the invention RFBC vessel assembly is shown in the side-view FIG. 2 drawing of a RFBC vessel assembly having alternative provided flanged tangential connected gas nozzles 2 welded to vessel shell 1 in lieu the centerline-positioned gas nozzles 2 shown in FIG. 1. The 2A-2A cross-sectional view of the FIG. 2 RFBC vessel assembly is shown in the FIG. 2A cross-section view drawing. This first embodiment variation can alternatively be employed as a means of optimizing the distribution and efficiency of outer annular space 10 gas flows within the vessel.

Figure 2A:
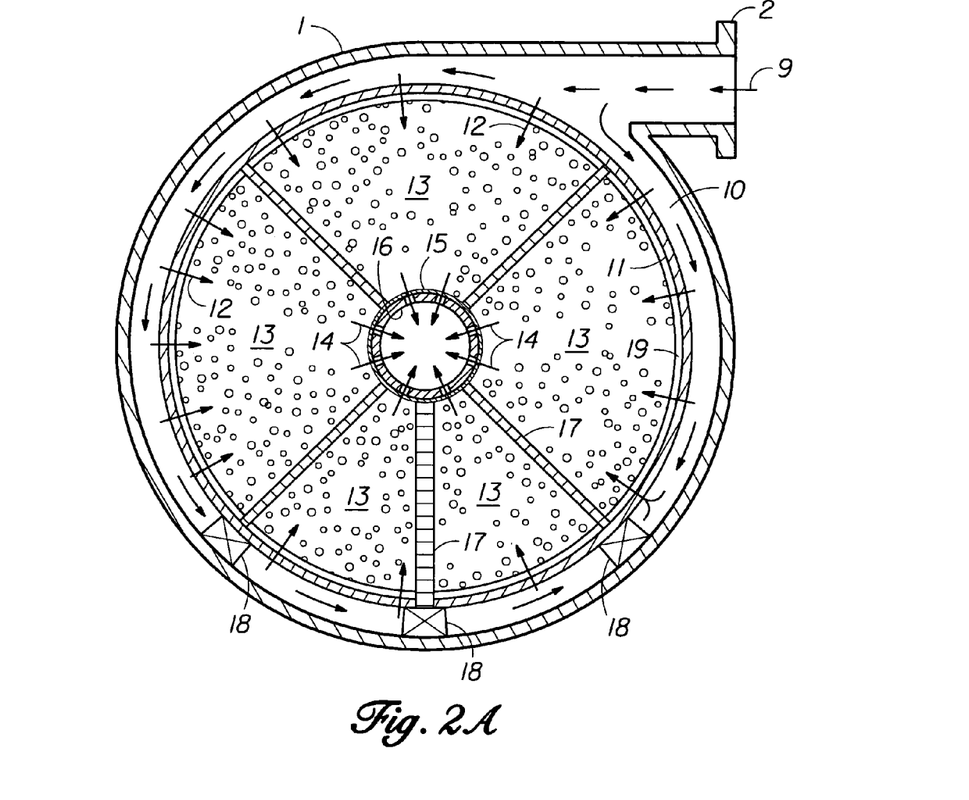
FIG. 2A is a cross-sectional view of the invention's first embodiment variance employed horizontal-type RFBC vessel assembly with side tangential-position gas connections, and displayed second embodiment internally-positioned RFBC sub-assembly.
Figure 3:
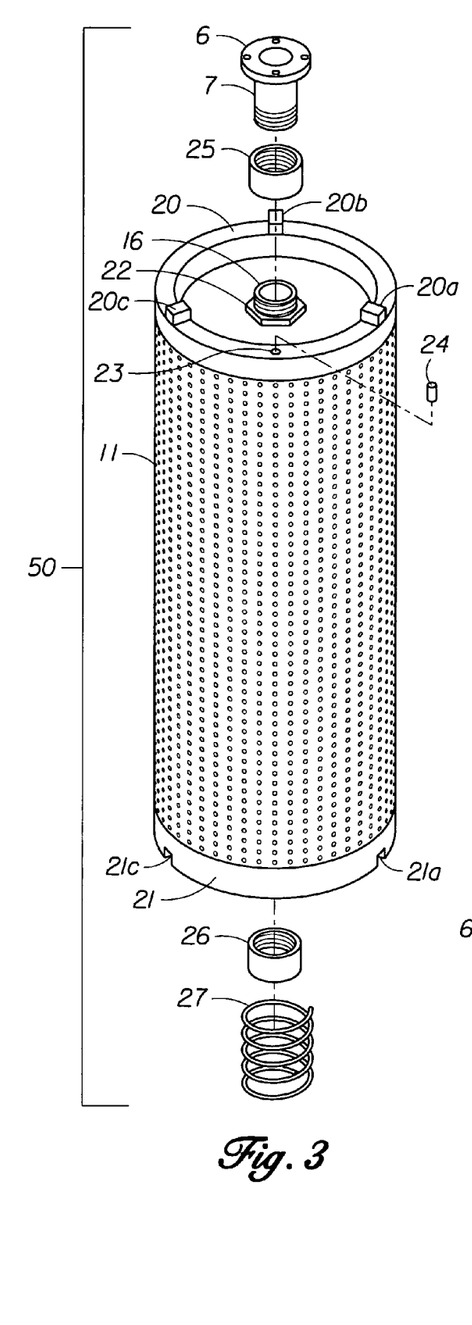
FIG. 3 is a perspective view of an example second embodiment RFBC sub-assembly and communicating positioning devices.

Referring now more particularly to FIG. 3, the drawing is a 3-dimensional exterior view of the invention embodiment example of a single RFBC subassembly 50 as partially illustrated in the preceding FIG. 1A and FIG. 2A drawings for placement exclusively within the invention respective FIG. 1 or FIG. 2 horizontally installed RFBC vessel assembly. Like reference characters appear in FIG. 3 as they are shown in FIGS. 1, 1A, 2, and 2A.

The cylindrical RFBC subassembly 50 total volume of interior adsorbent bed material closely approximates that of the volume contained within; (a) the outer surface boundary formed by the perforated metal corrosion resistant alloy sheet outer cover 11 with attached corrosion resistant wire mesh or other porous glass fiber or synthetic fiber based media material, (b) male end cap 20, and female end cap 21, and (c) the inner surface boundary formed by the outer diameter of perforated pipe or tube 16 with attached outer surface corrosion resistant wire mesh or other porous glass fiber or synthetic fiber based media material 15.

The female end cap 21 can be first connected to the outer cylindrical formed perforated metal corrosion resistant alloy sheet outer cover 11 by means of bonding, fusion, or other means. The inner pipe 16 can be machine threaded on both ends, with the pipe passing first through the center of end caps 21, followed later in assembly by passing through end cap 20.

On the female end cap 21 end of the RFBC subassembly, the inner pipe 16 end (not visible in this view) passing through the end cap 21 is sealed closed with a pipe cap 26, which further provides a means of: (a) securing the ends of the fore-described adsorbent bed partitions 17 to the interior face of end cap 21, (b) placing the RFBC subassembly in sealing compression (following installation of the adsorbent material) with the installation of male end cap 20 and tightening of hex nut 22 on other inner pipe end 16. Installation of threaded coupling 25 on the remaining threaded portion of inner pipe end 16 provides the means for the RFBC subassembly product gas flow to be flow communicated into the RFBC vessel assembly's adjustable axial-positioned and threaded cylindrical hollow element or pipe 7 with end welded flange 6 as shown in FIG. 1 and FIG. 2 drawings. When the RFBC subassembly is installed within the RFBC vessel assembly as shown in FIG. 1 and FIG. 2, one end of spring 27 is in contact with the end cap 21, and the other end is in spring compression contact with RFBC vessel assembly blind flange 4 as shown in FIG. 1 and FIG. 2.

Figure 4:
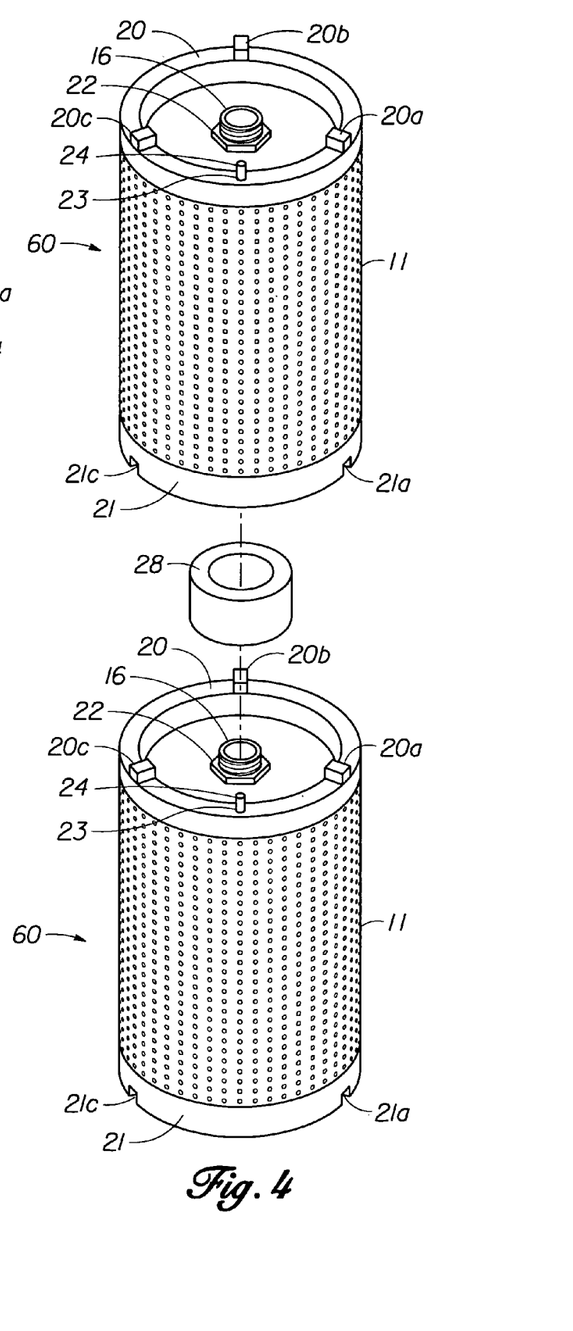
FIG. 4 is a perspective view for an example of two series-positioned second embodiment RFBC subassemblies and inner-subassembly communicating product gas flow device.

Referring now more particularly to FIG. 4, the drawing is a 3-dimensional exterior view of the invention embodiment example of two series-positioned RFBC subassemblies as positioned together within the invention RFBC vessel assembly. Like reference characters appear in FIG. 4 as they are shown in the FIG. 3 drawings. The presented example of two series-positioned and identically constructed RFBC subassembly, that can be can be employed within RFBC vessel assembly embodiment FIGS. 1, 1A, 2, and 2A, are typical also of greater than two series-connected RFBC subassembly that can be installed within the invention first embodiment described RFBC vessel assembly. With the FIG. 4 RFBC subassembly being of similar construction to that presented in the FIG. 3 RFBC subassembly, the following additional FIG. 4 description details pertains primarily to the presented RFBC subassembly features that have been provided exclusively for the viable application of common multiple series-positioned RFBC subassembly within a single RFBC vessel assembly.

Each presented RFBC subassembly contains a male end cap 20 with male 'lugs' identified as 20a, 20b, and 20c. To maintain a common alignment of all series-connected and identically constructed RFBC subassembly as they are installed within a common RFBC vessel assembly, each male lug 20a, 20b, and 20c is aligned with and inserted into the preceding installed RFBC subassembly female end cap 21 having identically aligned respective female lug inserts 21a, 21b (not shown), and 21c. A soft compressible RFBC subassembly transition gas seal 28 is provided for the connecting of gas flows 14 between each RFBC subassembly's inner pipe 16. The inner diameter of the transition gas seal 28 is slightly greater than the hex head nut 22 point-to-point hex dimension, and the outside diameter dimension provides sufficient resultant gas seal face contact with end caps 20 and 21. The uncompressed height of the seal is slightly greater than the combined heights of the recessed face depths of end caps 20 and 21 in direct contact with each other.

During the assembly of the RFBC subassembly, the male lug 20b on male end cap 20 and female lug recess 21b on end cap 21 are positioned to be in the 6 o'clock position as coinciding with the thickest bed partition 17 as shown in FIGS. 1A and 2A drawings. From the insertion of the RFBC subassembly (internally having the thickest bed partition 17 in the 6 o'clock position) into the RFBC vessel assembly, a large diameter and long RFBC subassembly will have the greatest resistance to bending moments created by the weight of the adsorbent material contained within the RFBC subassembly. The intermittent longitudinal spacing of anti-friction blocks 18 within the inside diameter of the vessel shell 1 (as shown in FIGS. 1A and 1B drawings), provides additional means of minimizing bending stresses within the RFBC subassembly. On both the male end cap 20 and female end cap 21A, a partially completed drilled hole 23 is furnished at the 12 o'clock position, as a vertical position reference to enable the proper positioning of the RFBC subassembly position within the RFBC vessel assembly. In future applications when new highly efficiency semi-conducting porous synthetic molecular sieve adsorbents become commercially available, partially drilled hole location 23 in end caps 20 and 21 will be replaced by an incorporated internal female-end electrical connector (not shown), electrically connected to future supplied electrode means (not shown) distributed through each previously described RFBC subassembly adsorbent bed segment 13. Male electrical pin connector 24 shall electrically connect one series-positioned RFBC subassembly to the other adjacent series-positioned RFBC subassembly. The future inserted and partially exposed electrical pin connector 24 projecting from each end cap that is not connected with an adjacent series-connected end cap, can in the future be electrically cable-connected to a controlled intrinsically-safe source of control power within electrical conduit boxes 40 shown in FIGS. 1, 2, and 5.

Figure 5:
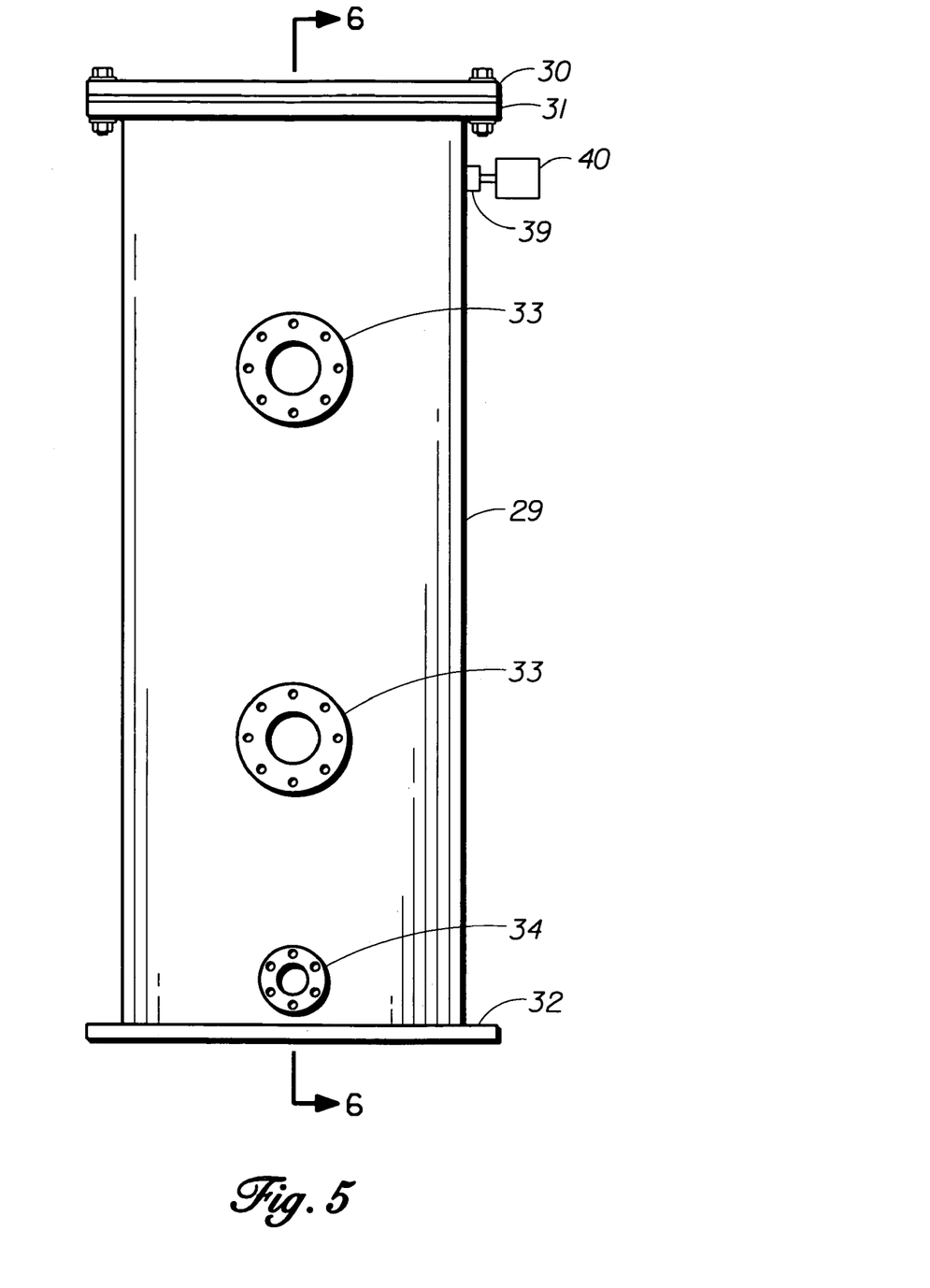
FIG. 5 is a side view of the invention's third embodiment employed vertical-type RFBC vessel assembly.

Referring now more particularly to FIG. 5, a side view is shown of the invention's third embodiment employed vertical-type gas adsorption-desorption vessel with flanged-pipe gas connections 33 and 34 radially-positioned to the vertical centerline of the vessel and welded to the outer vessel shell 29. For those skilled in the art, it will be readily apparent that the invention's third embodiment of a vertical vessel can also be configured with vessel tangential gas connections as shown in FIG. 2. A vessel mounting cylindrical base plate 32 is welded to the bottom end of outer shell 29, and upper vessel bolted flange 31 welded to the upper end of outer shell 29. A welded threadolet-type coupling 39 is attached to the vessel shell for future installation of electrical conduit box 40. A blind flange vessel gasketed cover plate 30 is bolted to flange 31 to form a gas tight vessel end seal. A variance to the cover plate 30 and flange 31 can comprise a commercially available pipe or vessel hinged closure assembly that is welded to the upper end of the RFBC vessel assembly shell 29.

Figure 6:
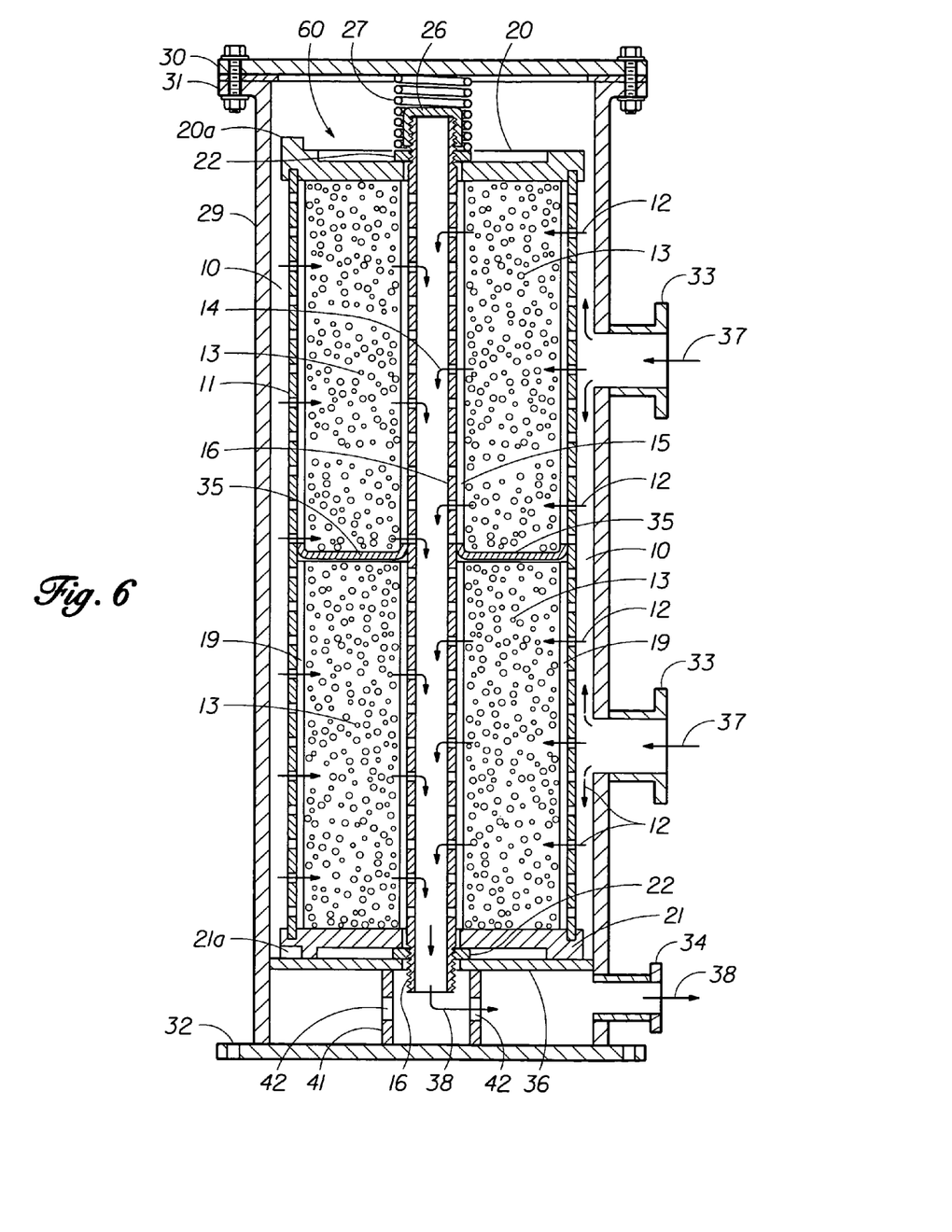
FIG. 6 is a cross-sectional view of the invention's third embodiment employed vertical-type gas RFBC vessel assembly with displayed internally-positioned fourth embodiment RFBC sub-assembly.

Referring now more particularly to FIG. 6, the FIG. 6 drawing shows the 6-6 cross-sectional view of the FIG. 5 RFBC vessel assembly. The FIG. 6 cross-sectional view shows the invention's fourth embodiment RFBC subassembly as predominantly having identical identified external and internal components to those of the invention's second embodiment as presented in the FIG. 3 RFBC subassembly 50, and FIG. 1A and FIG. 2A. The invention fourth embodiment shown RFBC subassembly varies from the second embodiment RFBC subassembly in the manner and device by which one internal adsorbent bed segment 13 is internally partitioned from another adjacent adsorbent bed segment 13. In a like manner, the invention's fourth embodiment RFBC subassembly can be series connected to another RFBC subassembly as shown in FIG. 4 subassembly view 60 for installation within a single RFBC vessel assembly.

The flow stream 37 of air or process gas feedstock enters the invention's RFBC vessel assembly apparatus through flange connection 33 that is welded to the RFBC vessel assembly outer shell 29. When the RFBC vessel assembly shell diameters are dimensionally greater than 4 feet, flange connections 33 can alternately be positioned on both sides of the adsorber assembly shell 29. This described positioning of flange connections 33 on larger diameter vessels can facilitate the flows of feed gas into the vessel during the adsorption operation sequence and the exiting of waste gases during the desorption operation sequence of gas separation. During the gas adsorption sequence of operation, the in-flow of air or process gas feedstock 37 enters the RFBC vessel assembly apparatus through flange connection 33 and the flow of gases are distributed at low gas flow velocities within the outer annular void space 10 surrounding RFBC subassembly 60 as further described later. The introduced flow of air or process gas feedstock 37 within void space 10 flows radially-inward as shown by directional gas flow 12 through perforated metal corrosion resistant alloy cover sheet 11 and inner surface attached corrosion resistant alloy wire mesh or other porous glass fiber or synthetic fiber based media material 19 that collectively secures the outer porous wall of each cylindrical adsorbent bed segment 13 as positioned within each radial-flow cartridge subassembly. The initial air or process gas feedstock flow velocity of gases 12 into the adsorbent bed 13 of greatly increased surface area is corresponding greatly reduced in velocity, as compared to a conventional PSA or VSA system's vertical vessel's gas velocity from its axial gas flow through an equal volume of adsorbent bed. As the waste gas portions of the feedstock gas are steadily adsorbed during the progressive radially-inward gas flow 12 penetration into each adsorbent bed segment 13 depth having a decreasing cross-sectional area, the desired product gas flow 14 that enters into the interior of pipe 16 (high purity oxygen in the case of a preferred type VSA air separation system) emerges from the inner surface of the adsorbent bed 13 at an approximate continued equal gas flow velocity rate as the feedstock flow 12 gas entry velocity into the adsorbent bed 13.

The product gas emerging from the adsorbent bed segments 13 passes through corrosion resistant alloy wire mesh or other porous glass fiber or synthetic fiber based media material 15 and through the perforated or slotted wall of pipe or tubing centerline axis-positioned central core pipe or tubing 16 as the total gross product 14 oxygen stream that is subsequently thereafter flow-exhausted from the lower portion of the RFBC vessel assembly as gas product stream 38 through pipe connection 34. One skilled in the art will readily recognize that the invention is not limited to oxygen separation, but can be adapted to separate other desired gases.

During the RFBC vessel assembly's PSA or VSA desorption sequence of operation (with counter-current directional gas flow to that indicated in FIG. 6 for the adsorption operation), the extraction flow of waste gases (contained with the RFBC subassembly adsorbent 13 and RFBC vessel assembly outer annular void space 10) comprise a reverse radially-outward flow of extracted or exhausted waste gases that collectively exits through connection 33. Prior to the low-end psia desorption operation pressure condition being achieved, a limited flow quantity of produced product gas can be axially introduced through RFBC vessel assembly connection 34 into the central axial core pipe or tubing 16. The flow of purge gas passes through the perforated or slotted openings in pipe or tubing 16 and attached wire mesh or other porous glass fiber or synthetic fiber based media material 15 into the RFBC subassembly adsorbent 13 for a contributed and continued radially-outward flow of mixed waste gases and purge gases that passes through adsorbent bed 13 and then through corrosion resistant alloy wire mesh or other porous glass fiber or synthetic fiber based media material 19 and perforated metal corrosion resistant alloy cover sheet 11 into outer void space 10 before exiting from the from the RFBC vessel assembly through connection 33 in a counter-current direction to the FIG. 6 shown feedstock gas supply stream 37 employed for the adsorption operation. The flow of purge gas into the RFBC vessel assembly can be terminated just prior to the end of the employed system's designed desorption sequence of operation, or can be continued briefly to establish a system desired degree of internal vessel pressure.

Within a provided inner diameter of vessel shell 29, the annular gas distribution void space 10 cross-sectional flow area and volume is established by the diameter of the example RFBC subassembly 50 (FIG. 3), and proper RFBC subassembly centering provided by the combined lower RFBC subassembly projection of the threaded end of pipe 16 passing through the RFBC vessel assembly bottom plate 36 at the vessel's vertical centerline position and the outer face of end cap 21 compression contact on the horizontal bottom plate 36 of the RFBC vessel assembly.

Whereas FIG. 6 shows a single invention fourth embodiment RFBC subassembly whose total adsorbent bed as divided into two example bed segments, each hollow core cylindrical adsorbent bed segment 13 is established within the volumetric boundary formed by: (a) the combined perforated metal corrosion resistant alloy cover sheet 11 and inner surface attached corrosion resistant alloy wire mesh or other porous glass fiber or synthetic fiber based media material 19, (b) a circular metal intermediate diaphragm adsorbent support partition 35 either fastened, bonded, or fused to both perforated metal corrosion resistant alloy cover sheet 11 and the central axial core pipe or tubing 16, (c) the interior surface of end caps 20 or 21, and (d) central axial core pipe or tubing 16 and outer surface attached corrosion resistant wire mesh or other porous glass fiber or synthetic fiber based media material 15. In the case wherein the RFBC subassembly total adsorbent bed is divided into three or more (not shown) bed segments 13, each additional adsorbent bed segment 13 would be positioned between the two fore-described adsorbent bed segments 13. Each additional hollow core cylindrical adsorbent bed segment 13 volumetric boundary then would be formed by the combined: (a) perforated metal corrosion resistant alloy cover sheet 11 and inner surface attached corrosion resistant wire mesh or other porous glass fiber or synthetic fiber based media material 19, (b) central axial core pipe or tubing 16 outer surface attached corrosion resistant wire mesh or other porous glass fiber or synthetic fiber based media material 15, (c) a top and bottom circular solid metal adsorbent intermediate support tray partition 35, either fastened, bonded, or fused to both perforated metal corrosion resistant alloy cover sheet 11 and the central axial core pipe or tubing 16.

Male end cap 20 and female end cap 21 maintain a compression contact on the assembly method provided precisely pre-compacted adsorbent bed segments 13 and the outer perforated metal corrosion resistant alloy cover sheet 11 from the applied tightening of the machine thread hex head nuts 22 on both ends of pipe 16 and in compression contact with the end caps recessed face surfaces. Following assembly, either or both end caps may undergo a heat fusion or bonding action for permanently mating to the outer perforated metal corrosion resistant alloy cover sheet 11 portions that are recessed partially into each end cap. The portion of threaded pipe end 16 extending above the face of end cap 20 is closed and sealed with the installation of machine thread pipe cap 26. Upon closure of the top portion of the vertical RFBC vessel assembly from the installation of top gasketed cover plate 30, spring 27 installed around pipe cap 26 exerts a compression securing force on the top of the RFBC subassembly 50. The fore-described bottom vessel horizontal plate 36 is welded to the inside surface of vessel shell 29, and one end of cylindrical support member 41 having multiple support wall circular hole gas passageways 42 is welded to plate 36. The other end of pipe 41 maintains surface contact with the horizontal vessel floor mounting plate 32 welded to the lower end of vessel shell 29.

FIG. 6 does not show all identified described end cap 20 and end cap 21 details presented for FIG. 3 and FIG. 4 drawings, nor the presented provisions for future applications when new highly efficiency semi-conducting porous synthetic molecular sieve adsorbents become commercially available. These details are however included by reference to the FIG. 6 descriptive references to FIG. 3 and FIG. 4.

While the invention has been particularly shown and described with references to preferred employed embodiments of single RFBC subassembly or series-connected RFBC subassemblies positioned within a RFBC vessel assembly in order to simplify the described and visually presented invention, it is appreciated that apparatus variations may be made to best adapt the invention to varied gas capacity rated separation applications. It will be additionally understood by those skilled in the art and having familiarity with conventional art natural gas particulate and coalescing filter separators, that highly economical standardized designed production line quantities of multiple small diameter filter cartridge elements may be parallel-positioned within a vessel assembly with their centerlines concentrically arranged about the centerline of the vessel. A similar described parallel arrangement of smaller diameter RFBC subassemblies can be employed as an economically viable and desirable variance to the second and fourth embodiment of RFBC subassemblies and their placement within their respective first and third embodiment RFBC vessel assemblies, without departing from the scope and spirit of the invention.

While this invention has been particularly described with references to the embodiments thereof, it will be understood by those skilled in the art that various changes in form and details may be made therein without departing from the scope of the invention encompassed by the appended claims.

I claim:

1. A highly energy-efficient, radial-flow gas separation vessel apparatus for pressure- or vacuum-swing separation of gaseous components from supplied mixture of feedstock gases during adsorption and desorption cycle operations, the gas separation vessel apparatus configured to enable rapid changes of adsorbent bed material used to separate the gas mixture, the gas separation vessel apparatus comprising:
   (a) a vessel assembly containing one or more cylindrical-shaped, radial-flow bed cartridge-type adsorbent subassemblies, the vessel assembly having,
      (1) an outer shell, an inner surface, two ends, and at least one inlet connection, for supplying the feedstock mixture of gases to be separated during the gas separation apparatus's adsorption sequence of operation,
      (2) two closure means for sealing the vessel assembly's outer shell, one closure means secured to each of the ends of the vessel assembly's outer shell, and
      (3) at least one outlet connected to the vessel assembly outer shell through which adsorbent-selective gas desorbed from the adsorbent can be exhausted from the gas separation apparatus during the desorption sequence of operation; and
   (b) one or more axially-positioned and cylindrical-shaped radial-flow bed cartridge-type subassemblies designed for placement into the vessel assembly, each cartridge-type subassembly having two ends, an outer surface, and
      (1) a cylindrical perforated alloy metal cover sheet having two ends and an inner surface attached wire mesh or other synthetic media material,
      (2) an end cap on each end of the cartridge-type subassembly that is secured to the ends of the cylindrical cover sheet,
      (3) an adsorbent bed contained within the cartridge-type subassembly through which the feedstock gases flow radially inward during the adsorption sequence, and through which the adsorbent's desorbed gas or gases mixture flows radially outward during the desorption sequence, the adsorbent bed having a depth that is configured to minimize radial gas velocities to avoid fracturing or attrition degradation of individual adsorbent bed or pellet structures within the adsorbent bed and the resulting loss of overall adsorbent bed performance efficiencies during long-term gas separation operations; and
   (c) a central pipe having two ends and axially-positioned in the cartridge-type subassembly for collecting the gas flows exiting the adsorbent bed, at least one end of the central pipe connected to the outlet of the vessel subassembly.

2. The gas separation vessel apparatus of claim 1, wherein each cartridge-type subassembly end cap provides an axial alignment-positioning means for serially connecting two or more axially-positioned radial-flow bed cartridge-type subassemblies together.

3. The gas separation vessel apparatus of claim 2, wherein the flows from one axially-positioned radial-flow bed cartridge-type subassembly is communicated to the adjacent axially-positioned radial-flow bed cartridge-type subassembly through a gas flow transition sealing means connected to the central pipe.

4. The gas separation vessel apparatus of claim 1, wherein a cylindrical volumetric void space axially surrounds the outer surface of the radial-flow bed cartridge-type subassembly and is bounded axially by the end closure means.

5. The gas separation vessel apparants of claim 4, wherein the volumetric void space is configured to provide a low velocity gas distribution of gas flows around the outer circumference of the radial-flow bed cartridge-type adsorbent subassembly, the distributed feed gas flowing radially inwardly into the subassembly's adsorbent bed during a vessel's adsorption sequence of operation, or an adsorbent-selected gas outwardly exhausted from a subassembly and distributed into the void space during a vessel's desorption sequence of operation.

6. The gas separation vessel apparatus of claim 1, wherein the vessel assembly has a length and a diameter, and the vessel assembly preferably comprises a dimensional ratio of vessel assembly length to vessel assembly diameter that is greater than 2.0.

7. The gas separation vessel apparatus of claim 1, wherein each radial-flow bed cartridge-type subassembly is designed to be installed and retained in place under a spring-compression means for either one or multiple series-positioned adjacent subassemblies within the radial-flow bed cartridge vessel assembly.

8. The gas separation vessel apparatus of claim 1, wherein each end cap is configured to be secured with screwed compression means to each end of the subassembly outer perforated cover sheet material.

9. The gas separation vessel apparatus of claim 1, wherein the gas separation vessel apparatus has an axial length and a diameter, and the axial length of the gas separation vessel assembly apparatus is at least two times the diameter of the apparatus.

10. The gas separation vessel apparatus of claim 1, wherein the gas adsorption bed material contained within one or more radial-flow bed cartridge-type adsorbent subassembly means is configured to be integrally removed from the vessel and replaced without altering the original construction integrity of the vessel.

11. The gas separation vessel assembly apparatus of claim 1, wherein the vessel assembly and radial-flow bed cartridge-type adsorbent subassembly is configured to be provided with intrinsically-safe electrical connecting means, which will enable future rapid vessel adsorbent bed adsorbent conversions to alternative adsorbent material.

12. A highly energy-efficient, radial-flow gas separation vessel apparatus for separating adsorbent selective and non-selective gases from a feedstock gas mixture, the gas separation vessel apparatus comprising:
(a) a cylindrical outer shell having an inner and outer surface, two ends, an inner longitudinal axis, and at least one inlet nozzle attached to the outer surface of the cylindrical outer shell for supplying a flow into the gas separation apparatus of the feedstock gas mixture to be separated;
(b) two closure means for sealing the cylindrical outer shell, one closure means secured to each of the ends of the cylindrical outer shell;
(c) an outlet nozzle attached to one of the closure means through which the adsorbent non-selective separated gas or gases is discharged; and
(d) a cartridge-type adsorption bed subassembly, having a longitudinal axis, and contained within the cylindrical outer shell, the adsorption bed subassembly having,
(1) an outer cover sheet, having two ends, an outer surface, and an inner surface, each end of the cover sheet secured by an end cap,
(2) a perforated or slotted inner central core pipe, having an outer and an inner surface, and generally centerline-positioned on the same internal axis centerline as that of the adsorption bed subassembly and in communication with the outlet nozzle, the perforated or slotted inner central core pipe configured to collect the flow of adsorbent non-selective separated gas mixture and direct the adsorbent non-selective separated gas mixture to the outlet nozzle for discharge, and
(3) a molecular sieve adsorbent bed radially contained between an outer cover sheet's inner surface attached wire mesh or other synthetic media material and an outer surface of the wire mesh or other synthetic media material attached to the outer surface of the inner central core pipe.

13. The radial-flow gas separation vessel apparatus of claim 12, wherein a vessel assembly and radial-flow bed cartridge-type adsorbent subassembly is configured specifically for a horizontal vessel assembly positioning, each radial-flow cartridge-type adsorbent subassembly generally centerline-positioned on the same inner horizontal axis centerline as that of the vessel assembly and comprising:
(a) an outer perforated cover sheet, having an inner surface;
(b) a perforated or slotted inner central core pipe having an inner and outer surface and oriented generally along the inner horizontal axis centerline as that of the subassembly's cylindrical outer cover sheet, the interior of the perforated or slotted central core pipe collecting flows of separated adsorbent non-selective gas, or gases therein, communicating these gases through one or both end caps attached to the ends of the cartridge-type subassembly's outer cover sheet;
(c) at least one layer of porous wire mesh or other synthetic media material attached to the outer surface of the central core pipe and the inner surface of the subassembly perforated outer cover sheet;
(d) a molecular sieve adsorbent bed axially contained between the two end caps of the cartridge subassembly and whose molecular sieve adsorbent composition is adapted to adsorb selected portions of the feed stock gas mixture;
(e) a horizontal cylindrical adsorbent bed having two to twelve radially-partitioned horizontal adsorbent bed segments of preferred gas-selective adsorbent material radially-positioned between side-support plate partitions having,
(1) one radial end connected to the inner surface of the outer perforated cover sheer material,
(2) one radial end connected to the outer surface of the slotted or perforated central core pipe, and
(3) one longitudinal end of a side-support plate partition in contact with the inner surfaces of each subassembly's end cap;
(f) a horizontal cylindrical adsorbent bed material volume contained within each horizontal adsorbent bed segments approximately comprising or established by
(1) the radial cross-sectional area between interior surfaces of adjacent side-support plate partitions;
(2) the axial longitudinal distance between the subassembly's interior end cap surfaces; and
(g) a horizontally-positioned cartridge-type subassembly wherein the radially gas flow adsorbent bed depth range can be configured with between one inch to forty inches over a range of small commercial to larger industrial gas volume flow rate applications.

14. The gas separation vessel apparatus of claim 12, wherein the adsorption bed vessel subassembly is configured such that more than one selective gas is separated from the feedstock gas mixture.

15. The gas separation vessel apparatus of claim 12, wherein at least one of the end closure means is removable.

16. The gas separation vessel apparatus of claim 12, wherein an adsorbent bed contained within the cartridge-type subassembly, through which the adsorbent's desorbed gas or gas mixture flows radially-outward during the desorption sequence, additionally including an ending desorption sequence's segment wherein a small quantity flow of purging gas passes radially-outward through the adsorbent bed.

17. A highly energy-efficient, radial-flow gas separation vessel apparatus for separating adsorbent selective and non-selective gases from a feedstock gas mixture, the gas separation vessel apparatus comprising:
  (a) a cylindrical outer shell having an inner and outer surface, two ends, and at least one outer shell attached inlet nozzle centerline positioned perpendicular to the axial centerline of the vessel assembly for supplying the flow into the cylindrical vessel assembly of the feedstock gas mixture to be separated;
  (b) two closure means for sealing the cylindrical outer shell, one removable closure means secured to one of the ends of the cylindrical outer shell, and a fixed closure means secured to the other end or near the other inner surface end of the vessel outer shell;
  (c) a gas outlet nozzle means, attached to or in flow communication with a fixed closure means of the cylindrical outer shell, the gas flow communication being that of adsorbent non-selective separated gas or gases to be discharged or evacuated from the vessel assembly; and
  (d) a cartridge-type adsorption bed subassembly contained within the cylindrical vessel assembly providing means for maintaining the subassembly's axial centerline position within the cylindrical vessel assembly, the adsorption bed subassembly having
    (1) an outer cover sheet, having two ends and an inner surface, each end of the cover sheet secured by an end cap,
    (2) a perforated or slotted inner central core pipe or tubing, having an outer and an interior surface, and oriented generally along the centerline axis of the cylindrical subassembly's outer cover sheet and in gas flow communication with the vessel assembly's gas outlet nozzle, the inner central core pipe or tubing configured to collect the flow of adsorbent non-selective separated gas mixture and direct the adsorbent non-selective separated gas mixture to the outlet nozzle for discharge or evacuation, and
    (3) a molecular sieve adsorbent bed radially contained between a subassembly's outer cover sheet's inner surface attached wire mesh or other synthetic media material and between an attached outer surface of the wire mesh or other synthetic media material attached to the outer surface of the inner central core pipe or tubing.

18. The radial-flow gas separation vessel apparatus of claim 17, wherein a vessel assembly and radial-flow bed cartridge-type adsorbent subassembly can be configured specifically for a vertical vessel assembly positioning, the radial-flow cartridge-type adsorbent subassembly generally centerline-positioned on the same vertical-axis centerline as that of the vessel assembly and comprising:
  (a) an outer perforated cover sheet, having an inner and outer surface;
  (b) a perforated or slotted inner central core pipe or tubing having an outer and an inner surface and oriented generally along the vertical axis of the subassembly's cylindrical outer cover sheet, the interior of the inner central core pipe or tubing collecting flows of separated adsorbent non-selective gas, or gases therein, communicating these gases through one of two end caps attached to the ends of the cartridge-type subassembly's outer cover sheet;
  (c) a molecular sieve adsorbent bed axially contained between the two end caps of the cartridge subassembly and whose molecular sieve adsorbent composition is adapted to adsorb selected portions of the feed stock gas mixture;
  (d) the vessel assembly comprising a range of vessel shell lengths between 2 feet and 10 feet and shell diameters between 1 foot and 4 feet depending on the gas separation application;
  (e) a vertical cylindrical adsorbent bed having at least one vertical segment or two or more vertical segments employing a horizontal circular intermediate adsorbent diaphragm bed partition
    comprising a diaphragm outwardly secured to the inner surface of the subassembly's outer perforated cover sheet, and
    inwardly secured to the outer surface of the subassembly's central inner core pipe or tubing;
  (f) at least one vertical cylindrical adsorbent bed segment radially contained between vertical surfaces comprising
    (1) a wire mesh or other synthetic media material secured to the inner surface of the subassembly's outer perforated cover sheet material, and
    (2) a wire mesh or other synthetic media material secured to the outer surface of the perforated central inner core pipe or tubing; and
  (g) a vertical-positioned cartridge-type subassembly wherein the vertical adsorbent bed depth range is selectively configured according to a desired commercial application.

* * * * *